United States Patent [19]
Kintz et al.

[11] Patent Number: 5,182,048
[45] Date of Patent: Jan. 26, 1993

[54] COLLOIDAL ANTIMONY PENTOXIDE POWDERS AND METHOD OF MAKING

[75] Inventors: Donald P. Kintz, Westford; David L. Catone, Hopkinton, both of Mass.

[73] Assignee: Nyacol Products Inc., Ashland, Mass.

[21] Appl. No.: 767,482

[22] Filed: Sep. 30, 1991

[51] Int. Cl.$^5$ ............... B01F 3/12; C09K 21/04; C09K 21/00
[52] U.S. Cl. .................. 252/363.5; 106/18.28; 252/610; 252/611; 252/313.1
[58] Field of Search ............ 252/315.01, 309, 610, 252/313.1, 363.5, 611; 106/18.28; 423/617

[56]           References Cited
       U.S. PATENT DOCUMENTS

| | | | |
|---|---|---|---|
| 3,718,584 | 2/1975 | Beste et al. ........... | 252/309 X |
| 4,026,819 | 5/1977 | Langere et al. ........ | 252/309 X |
| 4,028,266 | 6/1977 | Langere et al. ........ | 252/309 X |
| 4,110,247 | 8/1978 | Gower et al. .......... | 252/313 R |
| 4,589,997 | 5/1986 | Watanabe et al. ...... | 252/313.1 |
| 4,741,865 | 5/1988 | Kintz et al. .......... | 106/18.28 X |
| 4,770,812 | 9/1988 | Watanabe et al. ...... | 252/309 |
| 4,770,813 | 9/1988 | Watanabe et al. ...... | 252/309 |
| 4,988,505 | 1/1991 | Watanabe et al. ...... | 424/76.3 |
| 5,008,036 | 4/1991 | Crompton et al. ...... | 252/313.1 |

*Primary Examiner*—Robert L. Stoll
*Assistant Examiner*—Daniel S. Metzmaier
*Attorney, Agent, or Firm*—Alvin Isaacs

[57]           ABSTRACT

Disclosed are a novel class of colloidal antimony pentoxide powders having improved dispersibility in polar solvents; and novel processes for preparing same, which processes include the initial step of preparing a new intermediate consisting of an antimony pentoxide/phosphoric acid sol containing at least 35% by weight of antimony pentoxide based upon the total weight of the sol.

4 Claims, No Drawings

COLLOIDAL ANTIMONY PENTOXIDE POWDERS AND METHOD OF MAKING

BACKGROUND OF THE INVENTION

This invention relates to colloidal antimony pentoxide powders useful as flame retardants and which are dispersible to colloidal size in polar solvents.

Products of this nature are known in the art. For example, Nyacol Products, Inc., assignee of this invention manufactures and sells under the trade designation: ADP 494 a polar solvent-dispersible colloidal antimony pentoxide powder which may contain on the order of 71-75% by weight antimony pentoxide and in which the colloidal particles are hydrated pentoxide. In general, these agglomerates, which are on the order of 10-40 microns in diameter before dispersion, form dispersions in polar solvents of particles predominantly on the order of 0.03 micron.

The aforementioned colloidal antimony pentoxide powder may be prepared by admixing colloidal antimony pentoxide, phosphoric acid and a suitable ethoxylated fatty acid amine; and thereafter drying in air to an adsorbed moisture content of no greater than three percent.

While the foregoing commercially available product has enjoyed commercial success and is entirely satisfactory for most contemplated uses, it nevertheless possesses less than optimum dispersibility in polar solvents.

Stated simply, the task of this invention is to provide colloidal antimony pentoxide powders of the foregoing general description and which have improved dispersibility in polar solvents.

BRIEF DESCRIPTION OF THE INVENTION

In accordance with the present invention, this task is solved in a simple and elegant manner by the steps of: (1) forming a sol consisting of antimony pentoxide sol and phosphoric acid; (2) concentrating the sol until the concentration by weight of antimony pentoxide is at least 35 percent, and preferably 50 percent or greater without gelation; (3) adding this concentrated phosphated sol to ethoxylated fatty acid amine; and (4) drying the resulting mixture to provide a colloidal antimony pentoxide powder having an adsorbed moisture content of no greater than 3.0 percent.

DETAILED DESCRIPTION OF THE INVENTION

As heretofore mentioned, it is known to prepare colloidal antimony pentoxide powders dispersible in polar solvents by admixing colloidal antimony pentoxide, phosphoric acid and a suitable ethoxylated fatty acid amine and then drying to an adsorbed moisture content of no greater than three percent. Specifically, a product of this description is commercially available from Nyacol Products, Inc. under the trade designation ADP 494.

While entirely satisfactory for most contemplated usages, the dispersibility of the powder in the polar solvent is less than optimum. Specifically, there is a tendency for "clumping" or flocculation to occur. Moreover, colloidal antimony pentoxide powders formed in the foregoing manner tend to vary greatly in the percentage of sol dispersed in the polar solvent which will pass through a nominal (e.g. paper) 8 micron filter. Specifically, this percentage has been found to range from 0.5 to as much as 20 percent which will not pass.

The present invention provides a preparation which will permit at least 99.9 percent to pass through the 8 micron filter or, stated another way, in which 0.1 percent or less will not pass. This not only appreciably enhances dispersibility in a polar solvent, but also provides a product which is extremely uniform and predictable from a quality control standpoint in terms of the particle size of the dispersion.

The concentrated phosphated sol consisting solely of antimony pentoxide and phosphoric acid wherein the percentage by weight of antimony pentoxide is at least 35 percent is believed by Applicants to be novel in that they are not aware of any known sols of this description having an antimony pentoxide percentage this high without the addition of amine or some other additive. This novel intermediate is capable of independent usage in products which preclude the presence of the amine and/or other organic material.

The presence of both the phosphoric acid and the amine in the colloidal powders to which this invention is directed is necessary to provide dispersibility in the polar solvent. Although the percentages of each are not capable of precise quantification, the selection of particular percentages to be employed will at most require minimal routine experimentation and in any case will be within the expected judgement of the skilled worker in the light of this description. Accordingly, in the appended claims the amounts so used may be defined as being "effective amounts", meaning amounts sufficient to provide the desired effective dispersibility in the selected polar solvent. By way of illustration, amounts of phosphoric acid as low as 2.2 percent of the weight of antimony pentoxide and of amine as low as 4.0 percent have been found to be acceptable.

The amines employed in the practice of this invention may in general be described as being ethoxylated amines derived from higher fatty acids containing at least 12 carbon atoms, e.g. tallowamine, cocoamine, oleylamine, soyaamine, etc. Preferred are the class of tertiary amines having one to two fatty alkyl groups (derived from various fatty sources having 12-18 carbon atoms) and one to two polyoxyethylene groups attached to the nitrogen atom.

Suitable polar solvents to be employed include acetone, acetonitrile, dimethylacetamide, methylethylketone, etc.

The colloidal antimony pentoxide powders of this invention may be employed to provide flame retardancy in the manner heretofore known in the art, e.g. coating or impregnating textiles or other articles to be treated with a dispersion comprising the powder in a polar solvent as heretofore described, and then drying to remove the solvent.

The following examples show by way of illustration and not by way of limitation the practice of this invention.

EXAMPLE 1

1822.6 gms. of antimony pentoxide sol were treated with 8.29 gms. of phosphoric acid (85%). [This is equivalent to about 2.2 percent phosphoric acid of antimony pentoxide.] The resulting sol was concentrated by boiling to provide a phosphated sol containing about 53.83 percent antimony pentoxide and having a specific gravity of 1.933. [It is notable that the dried solids which tend to cake on the beaker wall at the surface were very easily redispersed upon rinsing with water.]

EXAMPLE 2

7.33 gms. of 85 percent phosphoric acid were added to 1510.88 grams of antimony pentoxide sol containing 288 grams of antimony pentoxide. 380.05 grams of this sol were then heated to remove water to provide a concentrated phosphated sol containing about 56.6 percent antimony pentoxide and having a specific gravity of 2.031

EXAMPLE 3

33.44 gms. of the phosphated concentrated sol prepared in Example 1 were added to 7.2 gms of 30 percent "ETHOMEEN" C/25 (trademark of Akzo Chemical for a polyoxyethylene (15) cocoamine. The resulting mixture was dried for about 3 hours at 107° C. on a flat plate to a moisture content of about 0.5 percent. After drying the dried cake was ground in a mortar. The colloidal antimony pentoxide powder so obtained was dissolved in dimethyl acetamide polar solvent with mild mixing. 100 percent (all) of the dispersion passed through a nominal 8 micron filter.

EXAMPLE 4

Example 3 was repeated using 6.0 gms. of 30% "ETHOMEEN" C/25 instead of 7.2 gms. Again 100% passed through the 8 micron filter.

From the foregoing illustrative examples, it will thus be seen that the present invention provides an elegant and highly efficacious procedure for obtaining greatly improved dispersibility in a polar solvent and moreover greatly improves quality control where the dispersed particles should be in a narrower size range, e.g. where at least 99.9 percent will pass through an 8 micron filter.

Since certain changes may be made without departing from the scope of the invention herein contemplated, it is to be understood that the foregoing description, including the examples, is to be taken as illustrative and not in a limiting sense.

What is claimed is:

1. A colloidal antimony pentoxide powder comprising a mixture of antimony pentoxide, phosphoric acid and an ethoxylated fatty alkyl amine, wherein said powder is dispersible in a polar solvent such that at least 99.9% of the dispersion will pass through a nominal 8 micron filter.

2. A colloidal powder as defined in claim 1 wherein the amine is a tertiary amine having one to two fatty alkyl groups and one to two polyoxyethylene groups attached to the nitrogen atom.

3. The method of making a colloidal antimony pentoxide powder dispersible in a polar solvent comprising the steps of:
    (1) forming a phosphated sol consisting of antimony pentoxide sol and phosphoric acid;
    (2) concentrating the sol by removing water until the concentration by weight of antimony pentoxide is at least 35 percent;
    (3) adding this concentrated phosphated sol to ethoxylated fatty alkyl amine; and drying to provide a colloidal antimony pentoxide powder having an adsorbed moisture content of no greater than about 3.0 percent.

4. The method as defined in claim 3 wherein the phosphoric acid and amine are present in amounts effective together to permit dispersibility in the polar solvent such that at least 99.9 percent of the dispersion will pass through an 8 micron filter.

* * * * *